United States Patent [19]

Graybeal

[11] Patent Number: 5,033,310

[45] Date of Patent: Jul. 23, 1991

[54] MANHOLE COVER INFLOW TEST DEVICE

[76] Inventor: Walter C. Graybeal, P.O. Box 361, 1st Ave., Williston, Fla. 32696

[21] Appl. No.: 499,058

[22] Filed: Mar. 26, 1990

[51] Int. Cl.$^5$ .............................................. G01F 1/00
[52] U.S. Cl. .......................................... 73/861; 73/38
[58] Field of Search .................................... 73/38, 861

[56] References Cited

U.S. PATENT DOCUMENTS

| 3,548,635 | 12/1970 | Hutchinson et al. | 73/38 |
| 3,861,196 | 1/1975 | Domenighetti | 73/38 |
| 4,070,903 | 1/1978 | Lees et al. | 73/38 |

Primary Examiner—Herbert Goldstein
Attorney, Agent, or Firm—Malin, Haley, McHale, DiMaggio & Crosby

[57] ABSTRACT

A test apparatus for measuring the rate (volume as a function of time) of surface water runoff infiltration inflow into a manhole that includes a portable liquid impervious barrier that can retain a predetermined volume of water and sized to extend and encompass a manhole cover and the manhole supporting structure, the barrier including a waterproof gasket along its base, and a liquid level measuring device positioned inside the barrier that can determine first and second liquid levels within the barrier as a function of time. When the liquid impervious barrier is filled with water, the device is actuated when a particular water level is reached. After liquid has infiltrated into the manhole structure, the level will drop in the barrier and when a predetermined low level is reached, the measuring device will compute the time lapsed and the volume that has left the barrier. The barrier also includes one or more apertures to ensure that a predetermined volume of liquid is in the barrier at the beginning of the test.

8 Claims, 2 Drawing Sheets

MANHOLE COVER INFLOW TEST DEVICE

BACKGROUND OF THE INVENTION

This invention relates generally to a test apparatus for measuring surface runoff water infiltration into a manhole and specifically to an apparatus used to simulate and measure the infiltration inflow rate of surface runoff water (or other liquids) into one covered manhole and its surrounding support structure on site.

Surface water, caused usually by rain fall, infiltrates sanitary sewer systems which greatly increases the treatment volume demands on municipal sewage treatment systems. If surface water runoff is allowed to infiltrate into a sewer system, the overall volume of sewage treatment increases and therefore costs increase greatly in areas where there are large annual rain falls and commensurate infiltration. The unnecessary treatment of surface runoff water often can overwhelm a sewer plant capacity which itself then causes overflows of unprocessed sewage into streams and other bodies of water, damaging the environment.

In the past it has been difficult to quantitatively determine the additional water volume due to infiltration that is added to an entire sewer system caused by surface runoff resulting from runoff inflow into each single manhole and its supporting structure. Because manhole covers and their supporting structures are not identical, the infiltration inflow rates can be different at each manhole site. At the present time it is difficult to identify which particular manholes in a sewer system are responsible for high or unacceptable infiltration inflow rates.

The present invention provides a portable, low cost test device that can be employed on site at any manhole to determine the rate of volume of water flow as a function of time that can infiltrate through the manhole cover and its supporrrng surface.

Manhole covers allow surface water to enter sanitary sewers during rain fall because each manhole cover includes required vent holes to prevent gas build-up in the sewer line and pick holes to allow for removal of the manhole cover. Often a loose fit exists between the manhole supporting structure and the manhole cover which provides for runoff water inflow areas.

The prior art shows a device that has been used to measure waste water volumes within sewer systems in U.S. Pat. No. 4,367,652 issued to Venuso Jan. 11, 1983. A device for measuring liquid flow rates within a sewer system is shown in U.S. Pat. No. 4,669,308 issued to Joritsma on June 2, 1987. These devices do not provide for the test measurement of the surface water infiltration inflow rate about a manhole (cover and supporting equipment) but measure sewage flow rates within the sewer lines.

The present invention can provide objective, accurate evidence of the overall infiltration inflow rate of surface water into a sewer system to those who deal with runoff drainage problems or sanitary sewage systems.

The information that can be obtained from Applicant's invention will allow a corporate utility that is responsible for a sewage treatment plant to determine cost effective solutions for installing surface water diversion equipment available in the marketplace on predetermined manhole covers. With the use of an infiltration inflow test apparatus, the need for installing manhole diverter equipment at every manhole in a sewer system is eliminated. The test apparatus can identify those manhole structures with high inflow infiltration that need the installation of surface water diverter equipment and identify those manhole covers that do not need diverter equipment, greatly reducing diversion equipment installation and maintenance costs for the sewer utility.

It is essential that the test equipment not influence the test results and that the test environment most naturally simulates those conditions that exist when surface runoff water accumulates by rain fall at and over the manhole cover. While in operation, the present invention does not disturb the manhole cover or its supporting equipment but interacts with the manhole cover and support structure as normally in place, thereby providing realistic, accurate test measurements on site without any change of the manhole or its surroundings during the test.

SUMMARY OF THE INVENTION

A test apparatus for quantitatively measuring the infiltration inflow of surface water runoff into a sewer system at and around a manhole cover comprising (1) a portable liquid container that is disposed around a manhole, and (2) a liquid flow rate measuring instrument portably disposed inside the container. The container is constructed as a hollow tubular-shaped liquid impervious barrier which includes a top annular rim, and a bottom annular rim having a liquid sealing gasket connected to and disposed around the bottom rim.

The liquid flow rate measuring instrument is actuated by high and low levels of liquid within the barrier over a period of real time that lapses between the states of high level and low level. A timing circuit provides information to microprocessor circuitry powered by a battery that calculates flow rate from a known liquid volume and the real time lapsed from high to low level. A display unit connected thereto allows the user to optically read the test flow inflow rate conditions at the manhole cover.

The container barrier wall is made from liquid impervious material (plastic, metal or other suitable material) and may include one or more apertures disposed at a strategic location near the top rim to define a fixed volume of liquid within the container below the aperture when even the container is filled on site with liquid up to the aperture(s). The gasket on the bottom rim in contact with the area surface around the manhole prevents liquid from leaking out at the bottom of the container.

To operate the invention, the container is placed over and around a manhole supporting surface on site thereby encompassing, circumferentially, the manhole cover and the cover supporting lip. The container is filled until water flows out of the apertures. The aperture location defines a predetermined level and therefore volume of liquid that can be held in the liquid container.

The liquid flow rate measuring instrument that is positioned within the container during a test includes a portable power source, timing circuit and microprocessor circuitry for calculating inflow rates. The instrument operates between first and second liquid level positions as defined by a pair of floats (upper and lower) that actuate electrical contact position switches. The timing circuit can determine the lapsed time between changes in the liquid levels (as determined by the floats)

between said first position (filled) and said second position (empty). A portable electrical power source such as a battery is connected to the timing and microprocessor level measuring circuit. Internal electronic logic circuitry between the power source, timing means and float switches which define liquid level positions can be provided by microprocessor circuitry that is known in the art and can be purchased from Artisan Electronics Co., Part No. EPC 12251.

In order to operate the invention, the user selects a manhole in which the infiltration rate of liquid is to be determined. The water container is placed circumferentially around the manhole cover and its supporting structure. The (bottom) diameter of the barrier is sized to ensure that the manhole cover and the collateral cover support structure are surrounded completely by the barrier wall of the container. Once the water container is in place, the liquid level measuring instrument is placed within the barrier wall.

The container is then filled (up to the apertures) with water providing a predetermined volume within the container.

The liquid level measuring device is turned on by the action of the lower float and is reset to time zero automatically by the action of the upper float when the barrier is filled to its maximum. If there is water infiltration inflow into the manhole cover, the level of water within the container will drop as a function of the rate of infiltration into the manhole opening and its support structure. The timing circuit is actuated upon reset by the upper float and the dropping action of the upper float. When the lower float reaches a predetermined low position, the timing circuit is turned off, through the action of a contact switch. The time from the upper float level drop to the lower level float drop is then determined by a clock in the timing circuit. The microprocessor circuitry then calculates the infiltration inflow rate based on the known volume of liquid within the container and the determined time lapse. An LED display mounted on top of the liquid flow measurement instrument provides a numeric display of the flow rate values existing during the test.

Upon the completion of the test, the liquid level measuring device is removed from within the container and the container is removed from the manhole. The apparatus is ready for transport and use on a different manhole site.

It is an object of this invention to provide an apparatus for test measuring the inflow rate of surface runoff water that can infiltrate a specific sewer manhole cover and its supporting equipment by volume as a function of time.

It is another object of this invention to provide simulated surface water runoff infiltration test apparatus which is not complex in structure and operation, which is portable and can be readily disposed about a manhole to measure rates of water flow into the manhole through the cover and its supporting structure.

It is another object of this invention to provide an apparatus which can identify specific manholes in a sewer system that have an unacceptable infiltration inflow rate and that require diverter equipment, eliminating diverter equipment installation in every sewer manhole necessary to reduce the infiltration of runoff water into a sewer system.

In accordance with these and other objects will be apparent hereinafter the instant invention will now be described with particular reference to the accompanying drawings.

PREFERRED EMBODIMENT OF THE INVENTION

Figure 1:
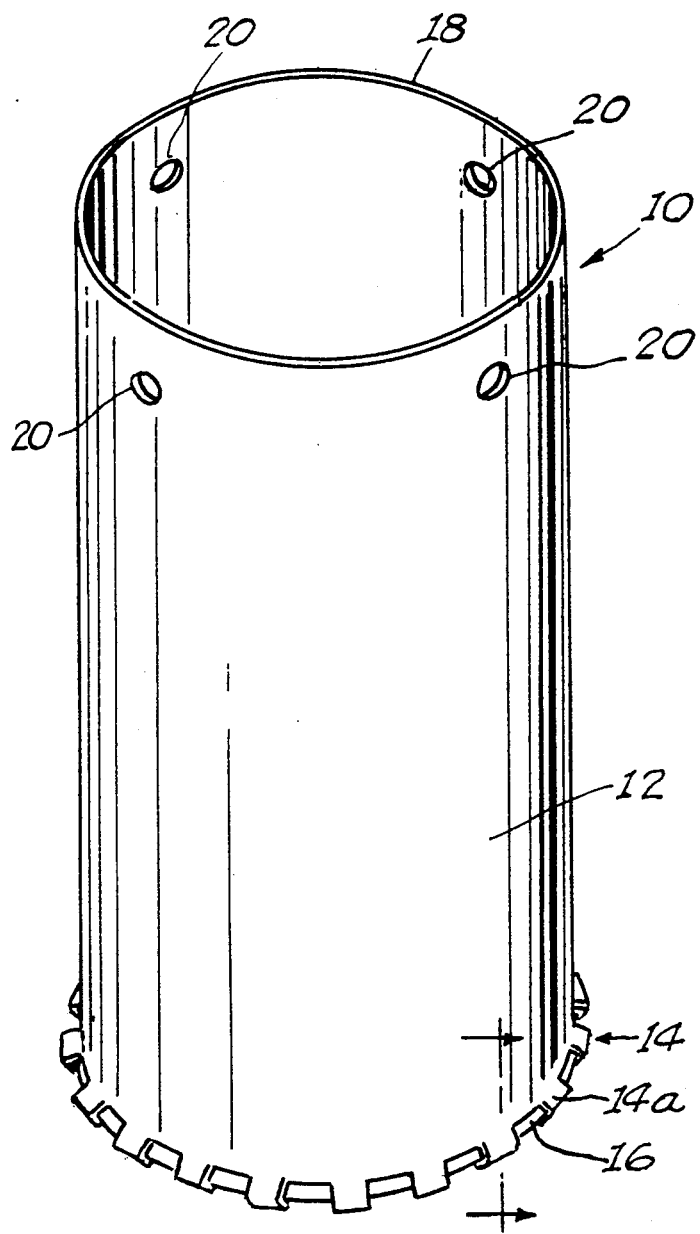
FIG. 1 shows a perspective view of the liquid container used in this invention.
Figure 2:
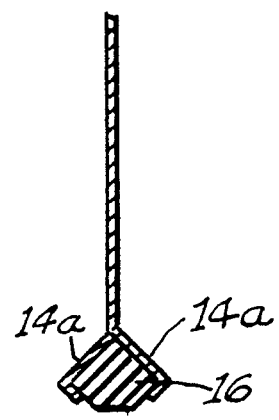
FIG. 2 shows a front elevational view in crosssection of the container shown in FIG. 1 through section "A—A".

Referring now to the drawings and specifically FIG. 1, a liquid container 10 is shown comprised of a liquid impervious barrier wall 12 substantially annular in shape having an open top defined by rim 18 and an open bottom defined by rim 14. The bottom rim 14 further includes a plurality of tabs 14a that are alternately spaced inwardly and outwardly relative to the barrier wall 12 to form a seat to receive an O-ring gasket 16 which is disposed completely around the bottom of the container 10. The purpose of the gasket 16 is to prevent water leakage from around the base of the container 10 while it rests on a surface surrounding a manhole. FIG. 2 shows a view of the gasket 16 (in cross section) and the location of the gasket relative to the seat provided by tabs 14a formed by a plurality of longitudinally disposed slots which are cut into the bottom rim 14. The tabs 14a are alternatively disposed (inwardly and outwardly) forming a seat for the gasket 16 so that water will not leak out of the container around its base which would distort the test results. Any drop in water level in the container must be confined to water loss due to infiltration inflow into the manhole system.

The container 10 also includes one or more overflow apertures 20 which are strategically positioned at a predetermined distance between the upper rim 18 and the lower rim 14. Specifically, the wall apertures 20 determine a fixed volume of water that can be retained within the container 10 when the barrier is filled to the apertures. Once the water level reaches the apertures, no more water can be held within the container as the excess will flow out through the apertures. This provides for a consistent, known volume of water in the container at the beginning of each test, that can be programmed into the liquid level test equipment.

Figures 3, 4:
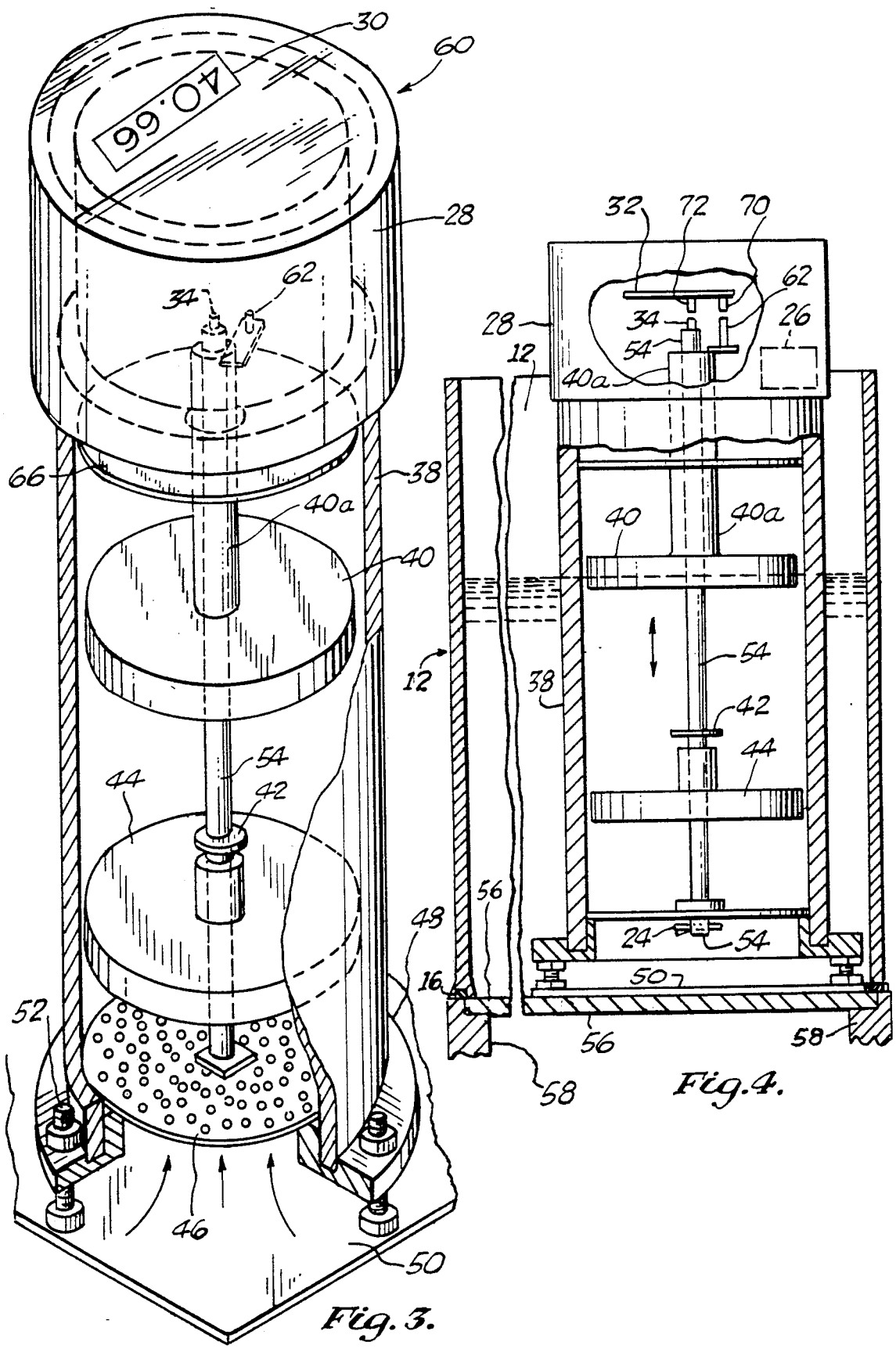
FIG. 3 shows a perspective view, partially cut away, of the portable liquid flow rate measuring instrument utilized in the present invention.
FIG. 4 shows a front elevational view in cross section of the liquid flow rate measuring instrument and container used with the present invention.

As shown in FIG. 3, the liquid level measuring instrument 60 is used to calculate the volume of water per unit time leaving the container 10 into the manhole (infiltration inflow rate). The operation of the instrument 60 is based on identification of two different liquid levels (high and low) within the container 10 as a function of time. The instrument 60 is constructed of a tubular housing 38 connected to a base support flange 48 attached by suitable threaded fasteners 52 to a base plate 50. The support flange 48 is spaced above plate 50 to allow water to flow laterally and upwardly into the housing 38 through sediment strainer 46 which also acts as a shaft guide along with shaft guide 66 for shaft 54.

The rigid support shaft 54 is vertically mounted through fixed guide 66 and guided and supported by strainer 46 within the housing 38. Mounted to shaft 54 is a lower float 44 and a lower float stop 42 which prevents the lower float from moving above the lower float stop. Also mounted to shaft 54 is an upper float 40 which slides longitudinally along the shaft between high and low positions. The upper housing 28 contains therein a microprocessor control circuit 32 actuated by electrical switch actuator 34 attached to the end of shaft 54 and switch actuator 62 attached to the upper float guide tube 40a, the operation of which will be explained below. A battery 26 is held within the upper housing along with the microprocessor circuitry and is coupled to numerical display 30 mounted within the top face of the device 60 so that the display can be read easily while mounted within container 10 during the test.

To operate the invention, a test on a particular manhole cover is described. Referring to FIG. 3 and FIG. 4, the liquid level instrument 60 is manually mounted within container 10 surrounding a manhole support structure 58 and its cover 56. The user fills the container 10 with water (up to the water runoff apertures 20 defining a predetermined volume of water within the container). As the container 10 is filled with water, the instrument 60 will receive water internally between plate 50 and support flange 48 and through sediment strainer 46 causing the lower float 44 to rise and engage float stop 42 and shaft 54 to rise. The switch actuator 34 on the end of shaft 54 actuates switch 72 on circuit board 32 turning the instrument 60 "on" upon the rising of the lower float. While the instrument 60 is being filled internally with water, the upper float 40 will rise, reaching a top level defined by the actuation of switch 70 by switch actuator 62 mounted on the upper float tubular guide 40a causing the system to "reset" back to a time zero condition.

As inflow infiltration takes place through the manhole cover or its surroundings, the level of liquid in the container 10 will begin to drop. As the water level drops, the upper float 40 will drop, causing disengagement of the switch 70, which tells the circuitry to start counting time in seconds. The timing process will continue until the water has been drained sufficiently into the manhole system causing the lower float 44 to drop, allowing shaft 54 to fall slightly, disengaging switch 72, stopping the timing clock. At that point in time, the microprocessor calculates flow rate based on the time that has passed between the disengagement of switch 70 and switch 72 and the programmed knowledge of the volume (gallons) in the container and generates a signal for the display 30 showing numerically gallons per minute or any desirable units of measure, indicative of the quantitative infiltration inflow for that particular manhole. The microprocessor provides an automatic "off" to the system after a predetermined time after the display 30 has been energized.

Referring again to FIG. 4, it is important that the liquid level device 60 does not in any way affect the results of the test by blocking or otherwise impeding water flow into the manhole system that includes cover 56 and support structure 58. This is accomplished by positioning the base plate carefully within the container on the manhole cover. The liquid level instrument 60 also ensures by its construction that positioning around the manhole will not disturb the test reliability. The spacing between the support flange 48 above the plate 50 provides for a horizontal flow of water out of the test instrument 60 at its base during each test so as to not interfere with the infiltration flow which might otherwise affect the test results. Without the plate 50, if the test instrument 60 is placed directly over an inflow hole in the manhole cover, the liquid level in the test instrument might recede due to direct vertical flow into an aperture in a manhole cover at a different rate than liquid level in the container 12 itself, causing variations in the test results.

Although the invention has been shown in its preferred mode, variations will be realized by those of skill in the art. Gasket 16 could be constructed from a bead of silicone instead of a rubber O-ring gasket, and the container could be square or rectangular if required.

What I claim is:

1. A test apparatus for measuring the rate (volume as a function of time) of surface water runoff infiltration inflow of a manhole cover and the manhole cover supporting structure comprising:

a hollow liquid impervious barrier open at the top and bottom having a top rim defining said top opening and a bottom rim defining said bottom opening, said barrier sized to completely encompass a manhole cover;

liquid sealing gasket mounted on said bottom rim of said barrier such that when said bottom rim gasket is positioned on a surface about a manhole, the barrier is capable of retaining liquid without leakage along the bottom rim;

separately moveable means positionable inside of said barrier for measuring first and second liquid levels within said barrier as a function of time based on a predetermined volume of liquid contained within said barrier; and means connected to said level measuring means for displaying the liquid volume change in said barrier as a function of time.

2. A test apparatus as in claim 1, including:

said barrier having at least one aperture disposed at a predetermined distance between the top rim and the bottom rim to define a fixed volume of liquid to be retained within said barrier between the lower rim and the aperture such that whenever a liquid is added within said barrier when positioned on a surface such as around a manhole cover and support, when the liquid level reaches said aperture, the barrier contains a predefined volume of liquid that is used to calculate the flow rate, so that said barrier can be quickly and efficiently filled with liquid of the proper volume for each test.

3. A test apparatus as in claim 1, wherein said barrier is substantially annular in configuration, said diameter sized to encircle a manhole cover; and a manhole cover about which said barrier is disposed.

4. A test measuring apparatus as in claim 1, wherein:

said barrier bottom rim includes a plurality of longitudinally disposed, equally spaced slots defining a plurality of tabs which are alternately spaced outwardly and inwardly relative to the plane barrier wall, said alternately spaced tabs forming a seat to receive said gasket.

5. A test measuring apparatus as in claim 1, wherein said liquid level measuring means includes:

means mounted in said barrier including a hollow vertically disposed chamber having an open bottom to permit inflow and outflow of liquid from said barrier, a first float and a first electrical switch connected to said first float for defining a first upper liquid level position disposed within said barrier when positioned over manhole supporting surfaces;

means mounted in said chamber including a second float and a second electrical switch connected to said second float for defining a second lower liquid level position disposed within said barrier, means connected to said first electrical switch and said second electrical switch for measuring the time difference between said first liquid level position and said second liquid level position, said first and second liquid level positions defining a fixed volume of liquid contained therebetween; and means connected to said measuring means for determining the volume per unit of time and for providing an output signal representing the volume per unit timed to said display.

6. An apparatus as in claim 5, including:

self-contained power source means connected to said liquid level measuring means to ensure that said apparatus may be operated in locations where conventional power is not available.

7. A test measuring apparatus as in claim 5, including:

a support plate attached below and connected to said hollow vertically disposed chamber of said liquid level measuring means, said plate mounted to dispose liquid flowing from said hollow vertically disposed chamber downwardly in a vertical direction to a horizontal direction to prevent all direct downward vertical flow of water from said hollow chamber to a horizontal direction.

8. The method of test measuring the rate of surface runoff (the volume of water per unit time) that infiltrates a swere manhole cover and said cover supporting structure comprising the steps of:

(a) disposing a hollow liquid impervious barrier having a sealed base rim and upper opening completely around and encircling said manhole cover and its supporting structure;

(b) (1) filling said barrier with a predetermined amount of liquid such as water;

(2) placing a liquid volume flow per unit time test instrument inside said barrier;

(c) measuring the change in volume of liquid in said barrier with said test instrument as a function of time, whereby the rate of lqiuid escaping through said manhole cover and its supporting structure can be accurately determined.

* * * * *